(12) United States Patent
Wan et al.

(10) Patent No.: US 8,917,072 B2
(45) Date of Patent: Dec. 23, 2014

(54) CONTROL CIRCUIT AND METHOD FOR PROVIDING A SIGNAL FOR A PWM VOLTAGE REGULATOR TO CONVERT AN INPUT VOLTAGE INTO AN OUTPUT VOLTAGE

(75) Inventors: Yi-Cheng Wan, Taoyuan County (TW); Jian-Rong Huang, Hsinchu (TW); Wen-Wei Chen, New Taipei (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 133 days.

(21) Appl. No.: 13/486,344

(22) Filed: Jun. 1, 2012

(65) Prior Publication Data

US 2012/0306586 A1   Dec. 6, 2012

(30) Foreign Application Priority Data

Jun. 2, 2011   (TW) .............................. 100119449 A

(51) Int. Cl.
*G05F 1/00*   (2006.01)
*H02M 3/156*   (2006.01)

(52) U.S. Cl.
CPC ...... *H02M 3/156* (2013.01); *H02M 2003/1566* (2013.01)
USPC ........................................................ 323/282

(58) Field of Classification Search
USPC ................. 323/222–226, 271–277, 280–285, 323/299–303; 363/39–48
See application file for complete search history.

(56) References Cited

U.S. PATENT DOCUMENTS

| | | | | |
|---|---|---|---|---|
| 4,387,351 A * | 6/1983 | Furiga et al. | ................... | 332/127 |
| 4,843,339 A * | 6/1989 | Burt et al. | ......................... | 330/10 |
| 4,866,367 A * | 9/1989 | Ridley et al. | ................... | 323/287 |
| 5,157,510 A * | 10/1992 | Quan et al. | ..................... | 386/255 |
| 5,194,965 A * | 3/1993 | Quan et al. | ..................... | 386/245 |
| 6,456,050 B1 * | 9/2002 | Agiman | ......................... | 323/282 |
| 6,504,409 B1 * | 1/2003 | Laletin | .......................... | 327/175 |
| RE38,940 E * | 1/2006 | Isham et al. | ................... | 323/224 |
| 7,061,225 B2 * | 6/2006 | Yang et al. | ................. | 324/103 P |
| 7,071,665 B2 * | 7/2006 | Tzeng et al. | ................... | 323/282 |
| 7,230,408 B1 * | 6/2007 | Vinn et al. | ..................... | 323/273 |
| 7,436,158 B2 | 10/2008 | Huang et al. | | |
| 7,482,793 B2 * | 1/2009 | Stoichita | ........................ | 323/282 |
| 7,615,982 B1 | 11/2009 | Guo | | |
| 7,714,556 B2 * | 5/2010 | Chu et al. | ....................... | 323/282 |
| 8,148,967 B2 * | 4/2012 | Xing et al. | ..................... | 323/288 |
| 8,531,166 B2 * | 9/2013 | Fang et al. | ..................... | 323/282 |
| 2002/0180410 A1 * | 12/2002 | Brooks | .......................... | 323/282 |
| 2003/0034762 A1 * | 2/2003 | Tateishi | ......................... | 323/282 |
| 2004/0021450 A1 * | 2/2004 | Wrathall | ........................ | 323/282 |
| 2004/0032242 A1 * | 2/2004 | Corva et al. | .................... | 323/284 |
| 2004/0135563 A1 * | 7/2004 | Mihalka | ......................... | 323/282 |
| 2004/0257056 A1 * | 12/2004 | Huang et al. | ................... | 323/282 |
| 2005/0017767 A1 * | 1/2005 | Huang et al. | ................... | 327/110 |

(Continued)

*Primary Examiner* — Timothy J Dole
*Assistant Examiner* — Yusef Ahmed
(74) *Attorney, Agent, or Firm* — Muncy, Geissler, Olds & Lowe, P.C.

(57) ABSTRACT

A control circuit and method for a PWM voltage regulator combine a high frequency feedback technique with a constant on-time or constant off-time topology to improve the transient performance of the PWM voltage regulator. The PWM voltage regulator generates a constant on-time or constant off-time depending on a current for generating a PWM signal, and dynamically adjusts the current according to the droop-voltage at its output during a transient period. Therefore, the PWM voltage regulator boosts its transient response without any threshold for load step detection.

10 Claims, 6 Drawing Sheets

(56) References Cited

U.S. PATENT DOCUMENTS

| | | |
|---|---|---|
| 2005/0052168 A1* | 3/2005 | Tazawa et al. ............... 323/282 |
| 2007/0013356 A1* | 1/2007 | Qiu et al. ..................... 323/288 |
| 2007/0035281 A1* | 2/2007 | Kuroiwa et al. ............. 323/222 |
| 2007/0109825 A1 | 5/2007 | Qiu et al. |
| 2007/0139102 A1* | 6/2007 | Laletin ......................... 327/552 |
| 2007/0200541 A1* | 8/2007 | Hachiya ....................... 323/282 |
| 2007/0241731 A1* | 10/2007 | van Ettinger ................. 323/280 |
| 2008/0088284 A1* | 4/2008 | Weng ........................... 323/271 |
| 2009/0080227 A1* | 3/2009 | Nakahashi ..................... 363/80 |
| 2009/0174383 A1* | 7/2009 | Tsui et al. .................... 323/282 |
| 2010/0148741 A1* | 6/2010 | Chen et al. ................... 323/285 |
| 2010/0213916 A1* | 8/2010 | Komori et al. ............... 323/293 |
| 2010/0214024 A1* | 8/2010 | Jones et al. .................. 330/310 |
| 2010/0283438 A1* | 11/2010 | Chung et al. ................. 323/268 |
| 2011/0031948 A1* | 2/2011 | Chien et al. .................. 323/282 |
| 2011/0109291 A1* | 5/2011 | Tang et al. ................... 323/282 |
| 2011/0109398 A1* | 5/2011 | Tang et al. ................... 332/110 |
| 2011/0148372 A1* | 6/2011 | Mariani et al. ............... 323/272 |
| 2011/0170698 A1* | 7/2011 | Komori et al. .................. 381/3 |
| 2011/0304308 A1* | 12/2011 | Wan et al. .................... 323/288 |
| 2012/0019219 A1* | 1/2012 | Fang et al. ................... 323/271 |
| 2012/0217941 A1* | 8/2012 | Chen et al. ................... 323/271 |
| 2012/0262082 A1* | 10/2012 | Esaki et al. .................. 315/224 |

* cited by examiner

US 8,917,072 B2

CONTROL CIRCUIT AND METHOD FOR PROVIDING A SIGNAL FOR A PWM VOLTAGE REGULATOR TO CONVERT AN INPUT VOLTAGE INTO AN OUTPUT VOLTAGE

FIELD OF THE INVENTION

The present invention is related generally to a pulse width modulation (PWM) voltage regulator and, more particularly, to a control circuit and method for a PWM voltage regulator.

BACKGROUND OF THE INVENTION

Recently, central processing units (CPUs) have to bear highly dynamic load currents that usually change very quickly from a light load to a maximal-load. The CPU current transient may happen within 1 µs, smaller than a switching cycle of a typical PWM voltage regulator, whether it is controlled in a voltage mode or a current mode. For solving this problem, a PWM voltage regulator that serves to provide a voltage to a CPU is usually set with a threshold of output voltage variation so that when the variation of its output voltage reaches the threshold, another non-closed loop adjusting mechanism can be triggered. For example, another PWM on-time can be triggered or its off-time can be immediately stopped or the duty of a PWM signal can be increased. However, such an approach has two major problems. First, the threshold of voltage variation is discrete, so transient response can only be improved when the droop-voltage at the output exceeds the threshold. Second, the threshold of voltage variation is fixed, and thus it can't meet a variety of applications. Additionally, in the event that the threshold setting relies on external components, additional pins will be required, which increases manufacturing costs and reduce the flexibility of circuit design.

Currently, voltage regulators for CPUs, for example U.S. Pat. No. 7,436,158, mostly use native adaptive voltage positioning (N-AVP) control. Conventional PWM structures usually use a ramp signal as the reference to be compared with the output voltage or the inductor current for generating PWM signals to control switching of voltage regulators. During transient where the load changes from a light to a heavy, the output voltage of a PWM voltage regulator drops suddenly, and this may lead to shutdown of the CPU. For improving control loop transient, there have been proposed many solutions. For example, U.S. Pat. Application publication No. 20070013356 uses a voltage-mode control loop to achieve quick transient response, while it suffers a timing issue caused by a synchronous clock and is unable to act instantly when transient occurs, U.S. Pat. Application Publication No. 20070109825 changes timing sources by detecting a load current. Although this art is helpful to solve the foregoing problem about clock timing, it is also unable to act instantly when transient occurs. U.S. Pat. No. 7,615,982 inserts a non-closed loop PWM pulse when the load current exceeds a preset threshold to improve transient response. While this art realizes instant transient response, its non-linear control can undesirably make the control loop of the voltage regulator unstable.

SUMMARY OF THE INVENTION

An objective of the present invention is to provide a control circuit and method for improving transient performance of a PWM voltage regulator.

Another objective of the present invention is to provide a control circuit and method for a PWM voltage regulator, which serve to dynamically adjust a PWM signal according to a voltage variation at the output of the PWM voltage regulator during transient.

A further objective of the present invention is to provide a control circuit and method for a PWM voltage regulator, which serve to determine whether transient occurs according to an output voltage ripple frequency of the PWM voltage regulator.

According to the present invention, a control circuit and method for a PWM voltage regulator combines high-frequency feedback technology with a structure of constant on-time or constant off-time to improve transient performance of the PWM voltage regulator.

According to the present invention, a PWM voltage regulator generates constant on-time or constant off-time according to a current to generate a PWM signal, and dynamically adjusts the current according to its output voltage variation during transient.

According to the present invention, a PWM voltage regulator detects its output voltage ripple frequency and uses a high-frequency feedback loop to adjust the current.

A control circuit and method according to the present invention achieve at least the following effects. First, there is no need of a threshold for load step detection because its triggering is only related to transient speed, and its response is directly proportional to transient speed and steps. Second, transient response is improved without using additional pins. Third, circuit board design is provided with high flexibility of changing the capability of speeding up transient response. At last, the control circuit and method according to the present invention are adaptive to various applications.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Traditionally, a PWM voltage regulator usually has an additional compensation circuit for filtering out the high-frequency component of a feedback signal. The present invention acts in a diametrically opposite way to provide a specially high-frequency feedback loop to control a high-frequency feedback signal for effectively improving a transient response of a PWM voltage regulator. The high-frequency feedback loop is a linear control loop and only acts on the high-frequency component of the control loop. The high-frequency feedback loop can be implemented by simple passive components and configurations.

Figure 1:
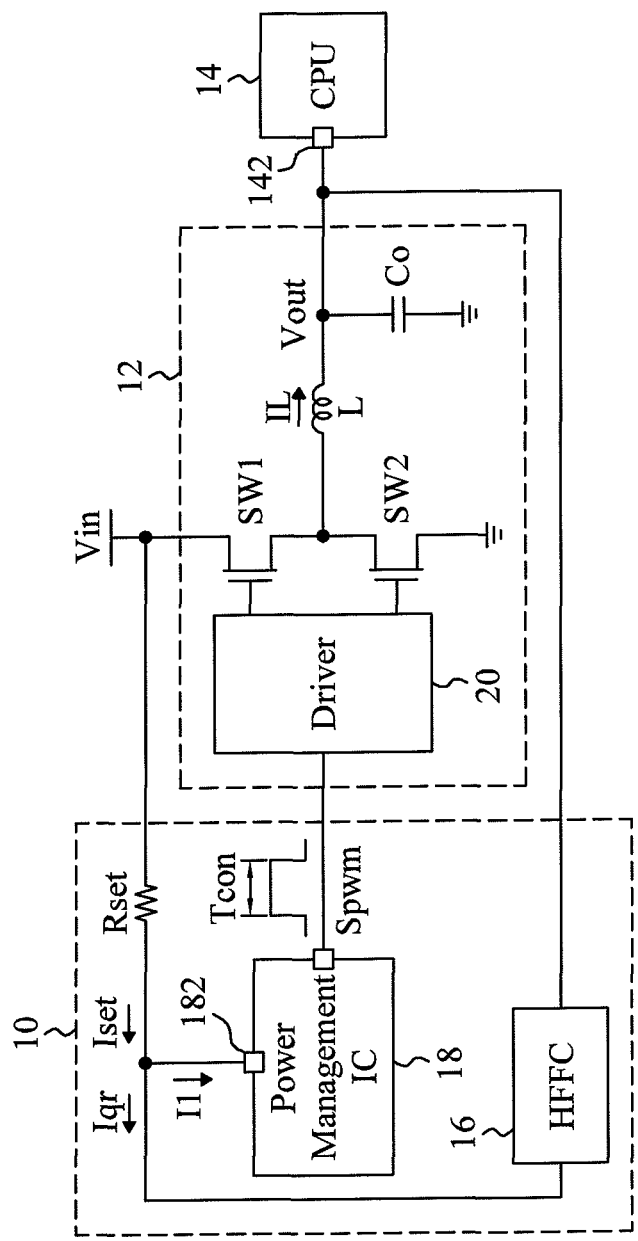
FIG. 1 is a circuit diagram of a CCR COT PWM voltage regulator according to the present invention.

As shown in FIG. 1, an embodiment according to the present invention is applied to a constant current ripple (CCR) constant on time (COT) PWM voltage regulator using N-AVP control and having a PWM triggering mechanism similar to a valley current mode COT control loop. As is well known, the PWM voltage regulator includes a control circuit 10 and an output stage 12, and the output stage 12 generates an output voltage Vout for a power input pin 142 of a CPU 14 according to a PWM signal Spwm from the control circuit 10. The output stage 12 includes a driver 20 for switching switches SW1 and SW2 according to the PWM signal Spwm, to control an inductor current IL to charge a capacitor Co, thereby generating the output voltage Vout. All the above are known in the art. The control circuit 10 includes a resistor Rset, a power management IC 18 and a high-frequency feedback controller 16. The resistor Rset is connected between a voltage input terminal Vin and a constant time setting pin 182 of the power management IC 18, for supplying a current Iset to the constant time setting pin 182. The power management IC 18 generates a constant time Tcon according to a current I1 received from the constant time setting pin 182, for defining on-time or off-time of the PWM signal Spwm. In the CCR COT PWM voltage regulator, the current I1 is directly proportional to the inductor current IL to make the ripple of the output voltage Vout fixed. The high-frequency feedback controller 16 is connected between the constant time setting pin 182 and the power input pin 142, for establishing a high-frequency feedback loop. The constant time setting pin 182 and the power input pin 142 are both pins originally provided on an IC or a chip, so there is no additional pin required in the embodiment.

Referring to FIG. 1, during normal operation, the ripple of the output voltage Vout is at a low frequency, and the high-frequency feedback controller 16 is open circuit, so the current I1=Iset that is flowing into the power management IC 18 via the constant time setting pin 182. When the output voltage Vout supplied to the CPU 14 drops fast and significantly, the ripple frequency of the output voltage Vout exceeds a threshold preset in the high-frequency feedback controller 16, making the high-frequency feedback controller 16 establish the high-frequency feedback loop that extracts a current Iqr through the constant time setting pin 182, thereby adjusting the current I1=Iset−Iqr and in turn adjusting the constant time Tcon. The current Iqr is dependent on a droop-voltage of the output voltage Vout, so the high-frequency feedback controller 16 can automatically track the droop-voltage of the output voltage Vout and adjust the current Iqr accordingly, thereby dynamically adjusting the constant time Tcon. Since the high-frequency feedback controller 16 is deposited on the circuit board but not in the power management IC 18, the accelerating ability of the high-frequency feedback controller 16 can be easily changed to meet requirements of different applications by properly arranging components in the high-frequency feedback controller 16. Thus, to circuit designers, the present invention has more flexible in terms of circuit design.

Figure 2:
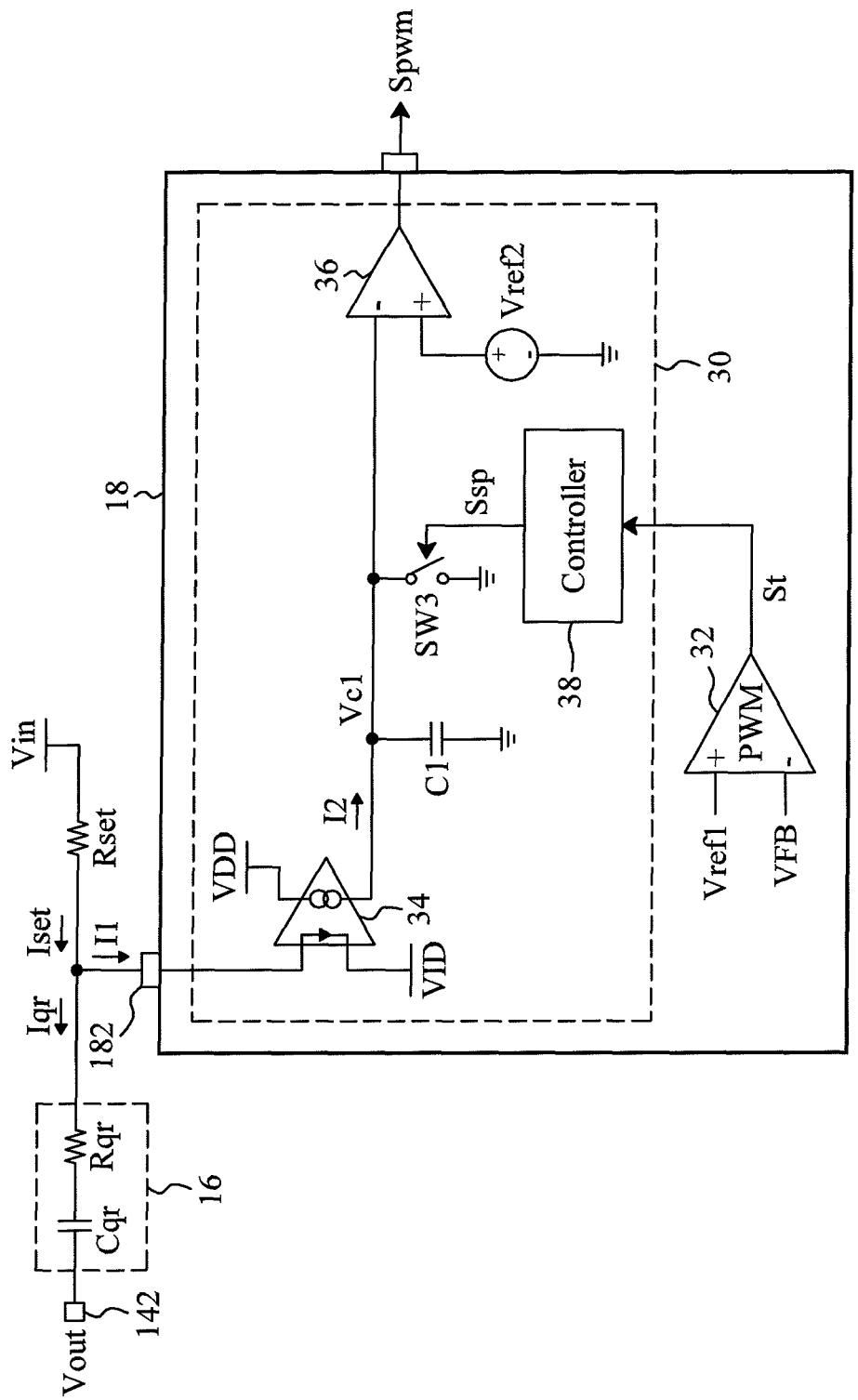
FIG. 2 is a circuit diagram of an embodiment for the power management IC and high-frequency feedback controller shown in FIG. 1.

FIG. 2 shows embodiments of the power management IC 18 and the high-frequency feedback controller 16 of FIG. 1. The power management IC 18 includes a constant-time generator 30 for generating the constant time Tcon according to the current I1, and a PWM comparator 32 for triggering a signal St for the constant-time generator 30 to trigger the PWM signal Spwm when a feedback voltage VFB is lower than a reference voltage Vref1. As well known, the feedback voltage VFB is the output feedback signal of the PWM voltage regulator and usually directly proportional to the output voltage Vout. The constant-time generator 30 includes a current control current source (CCCS) 34 for generating a current I2 that charges the capacitor C1 according to the current I1, a switch SW3 connected in parallel to the capacitor C1, a comparator 36 for comparing a voltage Vc1 at the capacitor C1 to a reference voltage Vref2 to generate the PWM signal Spwm. In one embodiment, when the controller 38, in response to the triggering signal St, generates a short pulse Ssp to rest the capacitor C1 to a grounding voltage, the PWM signal Spwm turns to a high level. When the short pulse Ssp ends so as to turn off the switch SW3, the voltage Vc1 at the capacitor C1 rises. When the voltage Vc1 reaches the reference voltage Vref2, the PWM signal Spwm turns to a low level. The current I2 determines the rising speed of the voltage Vc1, thereby determining the length of the constant on-time Tcon of the PWM signal Spwm.

Referring to FIG. 2, the high-frequency feedback controller 16 includes a high-pass RC filter composed of a quick response capacitor Cqr and a quick response resistor Rqr. The quick response capacitor Cqr and the quick response resistor Rqr are connected in series. The quick response capacitor Cqr is coupled to the power input pin 142, and the quick response resistor Rqr is coupled to the constant time setting pin 182. During normal operation, the ripple of the output voltage Vout is at a low frequency, so the quick response capacitor Cqr regards as open circuit. When transient occurs and the output voltage Vout drops suddenly (for high-frequency transient), the feedback voltage VFB drops to become lower than the reference voltage Vref1 immediately, thereby triggering the signal St to trigger the PWM signal Spwm and achieve a real time response. Meanwhile, since the ripple frequency of the output voltage Vout rises into a high frequency range, the quick response capacitor Cqr regards as a short circuit, so the quick response capacitor Cqr and the quick response resistor Rqr establish a shunt current path for extracting the current Iqr from the constant time setting pin 182 to decrease the current I1 and in turn the current I2. Due to the decrease of the current I2, the voltage Vc1 rises slowly, so the constant on-time Tcon of the PWM signal Spwm is increased, thereby preventing the too low output voltage Vout leads to shutdown of the CPU 14. By properly setting the RC value of the quick response capacitor Cqr and the quick response resistor Rqr in the high-frequency feedback controller 16, the voltage regulator can be effectively improved in transient response. In other embodiments, the quick response capacitor Cqr and the quick response resistor Rqr in the high-pass filter may be replaced by active components. In addition to the high-pass filter, the high-frequency feedback controller 16 may be implemented by using other high-frequency signal filtering circuits.

Since the control circuit 10 does not determine the occurrence of transient according to the variation of the output voltage Vout, there is no need to set a voltage variation threshold. Instead, the constant time Tcon of the PWM signal Spwm can be linearly adjusted according to the variation of the output voltage Vout, so the control loop is more stable. When the input voltage Vin changes, the load changes, or the voltage identification VID changes, and the output voltage Vout has transient, the control circuit 10 can provide better transient performance.

Figure 3:
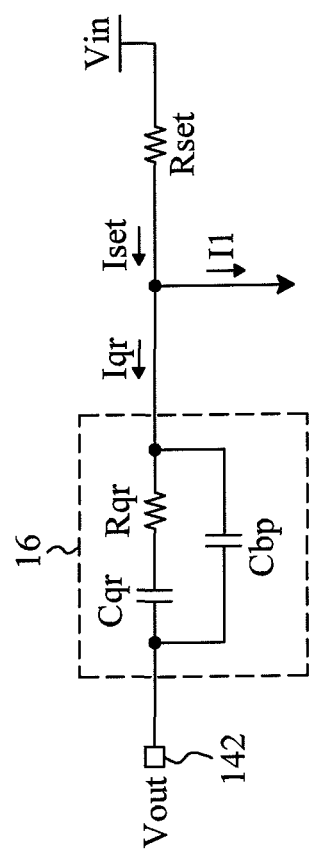
FIG. 3 is a circuit diagram of another embodiment for the high-frequency feedback controller shown in FIG. 1.

In the embodiment shown in FIG. 2, the quick response resistor Rqr makes the shunt current path maintained for a period after occurrence of transient. However, the current Iqr is limited by the quick response resistor Rqr, so the length of the constant time Tcon of the PWM signal Spwm is limited, causing the increased performance limited. FIG. 3 shows another embodiment of the high-frequency feedback controller 16. In addition to the first shunt current path formed by the quick response capacitor Cqr and the quick response resistor Rqr of FIG. 2, the high-frequency feedback controller 16 of FIG. 3 has a bypass capacitor Cbp that is connected in parallel to the quick response capacitor Cqr and the quick response resistor Rqr to establish a second shunt current path. Since the second shunt current path contains no resistor, after occurrence of transient, the bypass capacitor Cbp immediately draws a large current to generate a longer constant time Tcon. For the same reason that there is no resistor in the second shunt current path, the second shunt current path can only be maintained for a short period. After the second shunt current path becomes open circuit, the first shunt current path will be further maintained for a period, so the wide range load transient response can be significantly improved.

Figure 4:
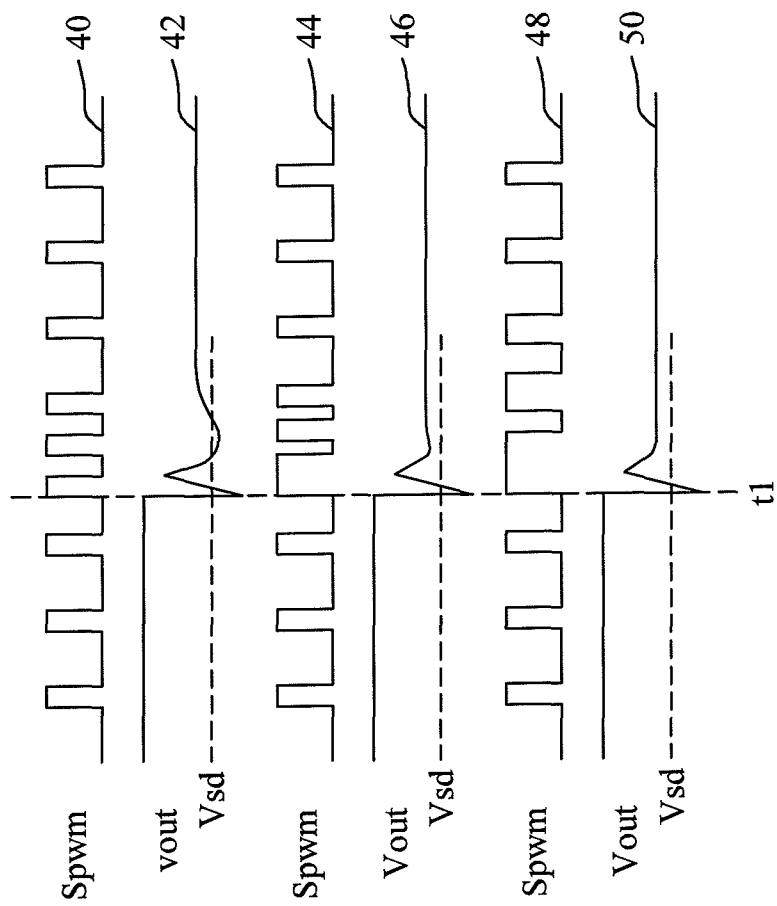
FIG. 4 is a waveform diagram of the PWM voltage regulator shown in FIG. 1.

FIG. 4 is a waveform diagram of the PWM voltage regulator of FIG. 1. Waveforms 44 and 46 represent the PWM signal Spwm and the output voltage Vout when the high-frequency feedback controller 16 of FIG. 2 is used, respectively. Waveforms 48 and 50 represent the PWM signal Spwm and the output voltage Vout when the high-frequency feedback controller 16 of FIG. 3 is used, respectively. For comparison, waveforms 40 and 42 represent the PWM signal Spwm and the output voltage Vout when the high-frequency feedback controller 16 is not used, respectively. When transient occurs, as at time t1, the constant time Tcon of the PWM signal Spwm without the high-frequency feedback controller 16 remains unchanged, as shown by the waveform 40, so it is impossible to instantly provide enough energy to stabilize the output voltage Vout, causing the output voltage Vout to become lower than the minimum voltage Vsd required by the CPU 14, as shown by the waveform 42. In the PWM voltage regulator using the high-frequency feedback controller 16 of FIG. 2, when transient occurs, the constant on-time Tcon of the PWM signal Spwm is instantly increased, so as to prevent the output voltage Vout from being too low and help the output voltage Vout to become stable again sooner, as shown by the waveforms 44 and 46. In the PWM voltage regulator using the high-frequency feedback controller 16 of FIG. 3, when transient occurs, the constant on-time Tcon of the PWM control signal Spwm is further increased, so the better performance is achieved, as shown by the waveforms 48 and 50.

Figure 5:
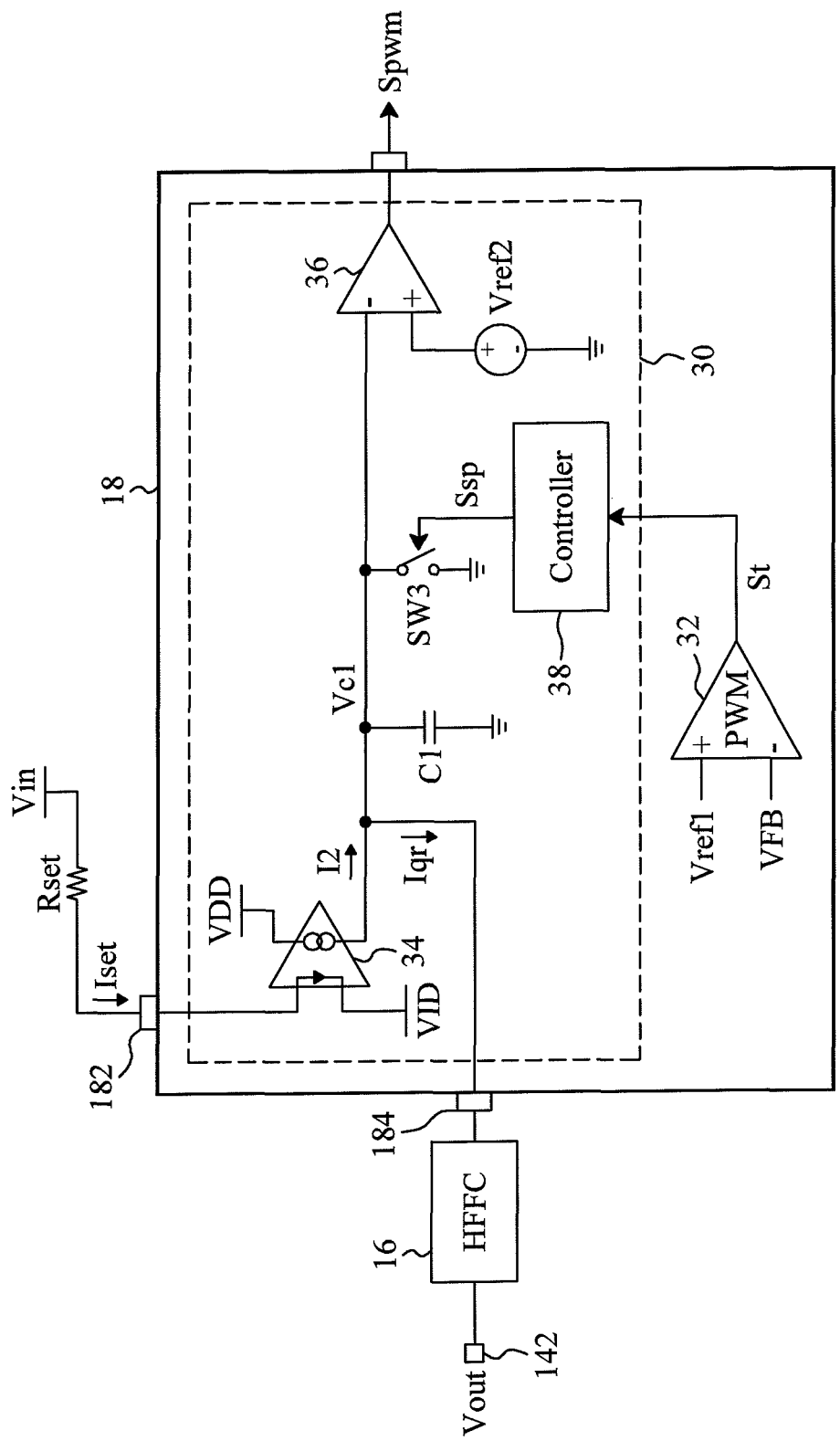
FIG. 5 is a circuit diagram of another embodiment for the power management IC and high-frequency feedback controller shown in FIG. 1.

In the embodiments shown by FIG. 1 and FIG. 2, the high-frequency feedback controller 16 changes the constant time Tcon by adjusting the current I1. However, in other embodiments, the high-frequency feedback controller 16 may be coupled to other nodes in the constant-time generator 30. For instance, in an embodiment shown in FIG. 5, the high-frequency feedback controller 16 is connected to the output terminal of the current control current source 34 through the pin 184 of the power management IC 18, and adjusts the current I2 to adjust the constant time Tcon when transient occurs. The pin 184 may be an additional pin.

Although the above embodiments are designed based on a CCR COT PWM voltage regulator for illustrating the principles of the present invention, it would be appreciated that other types of PWM voltage regulators, for example, constant on-time PWM voltage regulators and constant off-time PWM voltage regulators, may also use the high-frequency feedback controller 16 to adjust the constant time Tcon of the PWM signal Spwm.

Figure 6:
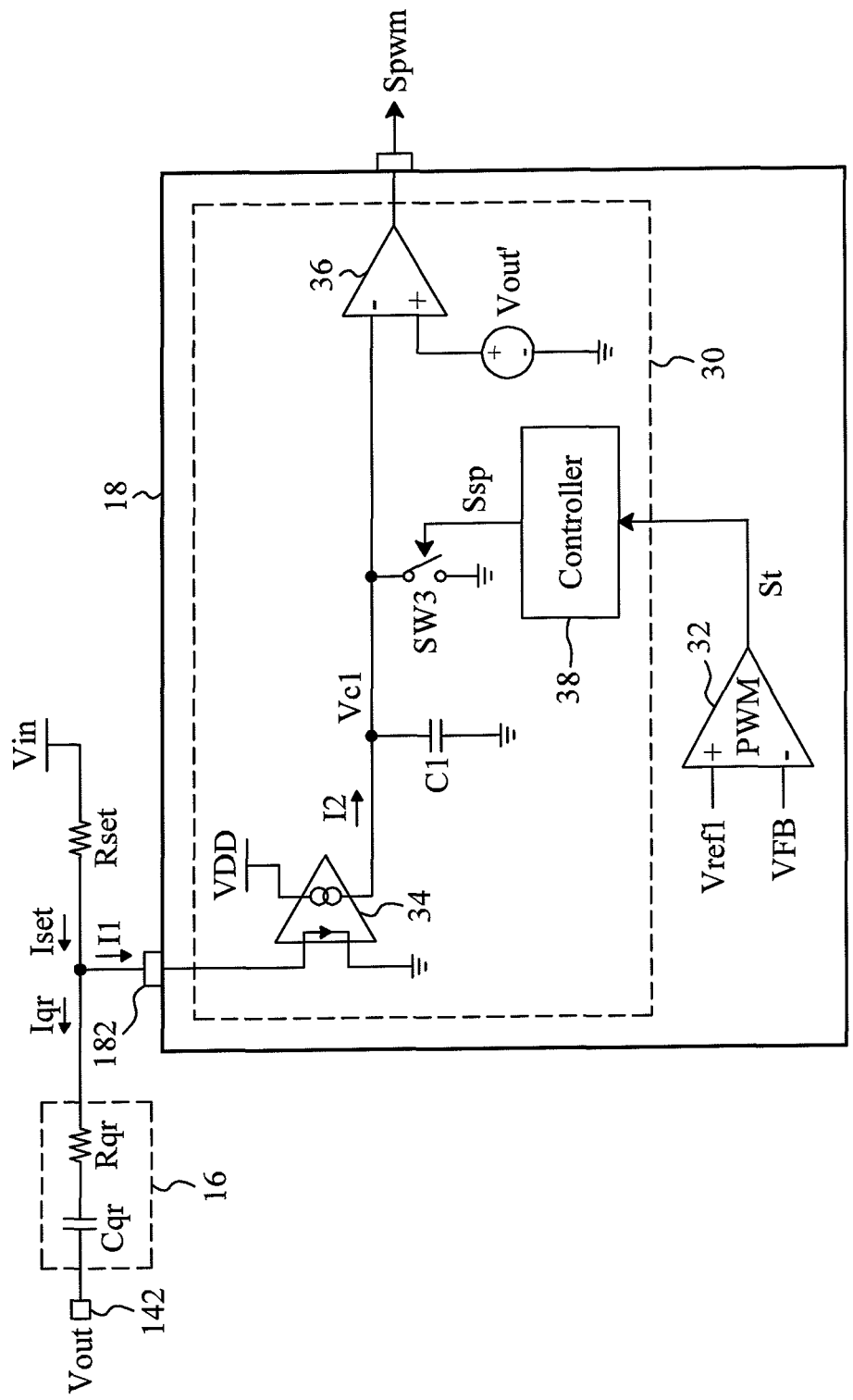
FIG. 6 is a circuit diagram of a control circuit for a constant frequency COT PWM voltage regulator according to the present invention.

FIG. 6 is a circuit diagram of a control circuit for a constant frequency COT PWM voltage regulator according to the present invention, which is the same as that shown in FIG. 2, except that the input terminal of the CCCS 34 that receives the voltage VID in FIG. 2 is grounded in this embodiment, and the reference voltage Vref2 is replaced by Vout' that is related to the DC component of the output voltage Vout, for example, extracted from the output voltage Vout by low-pass filtering. When transient happens to the output voltage Vout, the quick response capacitor Cqr and the quick response resistor Rqr establish a shunt current path for extracting a current Iqr from the constant time setting pin 182 of the power management IC 18 to decrease the current I1. The current I2 will vary with the current I1 and so adjust the constant on-time Tcon of the PWM control signal Spwm, thereby improving the transient response of the voltage regulator. The high-frequency feedback controller 16 shown in FIG. 6 may also be added with a bypass capacitor Cbp parallel connected to the serially connected quick response capacitor Cqr and quick response resistor Rqr to establish a second shunt current path, as that shown in FIG. 3. The high-frequency feedback controller 16 shown in FIG. 6 may be alternatively connected to the output terminal of the CCCS 34, as that shown in FIG. 5, to adjust the current I2 so as to adjust the constant time Tcon when transient occurs.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for providing a PWM signal for a PWM voltage regulator to convert an input voltage into an output voltage, the control circuit comprising:
    a constant-time generator generating a constant time to determine a constant on-time or a constant off-time of the PWM signal; and
    a high-frequency feedback controller connected to the constant-time generator, operative to establish a high-frequency feedback loop responsive to transient of the PWM voltage regulator, to adjust the constant time instantly;
    wherein the high-frequency feedback controller comprises a bypass capacitor parallel connected to a serially connected quick response capacitor and quick response resistor;
    wherein the constant-time generator comprises:
    a capacitor;
    a current-controlling current source connected to the capacitor, for determining a second current according to a first current to charge the capacitor;
    a switch connected in parallel to the capacitor, for resetting the capacitor; and
    a comparator connected to the capacitor, for comparing a voltage at the capacitor to a reference voltage to generate the PWM signal.

2. The control circuit of claim 1, wherein the high-frequency feedback controller comprises a high-frequency signal filtering circuit for establishing the high-frequency feedback loop.

3. The control circuit of claim 2, wherein the high-frequency signal filtering circuit comprises a high-pass filter.

4. The control circuit of claim 3, wherein the serially connected quick response capacitor and the quick response resistor are connected
    between the constant-time generator and an output terminal of the PWM voltage regulator.

5. The control circuit of claim 1, wherein the high-frequency feedback controller adjusts the first current to thereby adjust the constant time.

6. The control circuit of claim 1, wherein the high-frequency feedback controller adjusts the second current to adjust the constant time.

7. The control circuit of claim 1, further comprising a resistor connected to the constant-time generator for generating the first current according to the input voltage.

8. A control method for providing a PWM signal for a PWM voltage regulator to convert an input voltage into an output voltage, the control method comprising steps of:
- A.) generating a constant time to determine a constant on-time or a constant off-time of the PWM signal; and
- B.) establishing a high-frequency feedback loop responsive to transient of the PWM voltage regulator, to adjust the constant time instantly;

wherein the step B comprises a step of extracting a high-frequency signal through the high-frequency feedback loop;

wherein the step A comprises steps of:

determining a second current according to a first current;

generating a linearly varying voltage according to the second current; and comparing the linearly varying voltage with a reference voltage to generate the PWM signal.

9. The control method of claim 8, wherein the step B comprises a step of adjusting the first current to adjust the constant time.

10. The control method of claim 8, wherein the step B comprises a step of adjusting the second current to adjust the constant time.

* * * * *